US 012641141B2

(12) United States Patent　　Perl

(10) Patent No.:　US 12,641,141 B2
(45) Date of Patent:　May 26, 2026

(54) IDENTIFYING AN HTTP RESOURCE USING MULTI-VARIANT HTTP REQUESTS

(71) Applicant: Oracle International Corporation, Redwood Shores, CA (US)

(72) Inventor: Ivan Andreevich Perl, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 519 days.

(21) Appl. No.: 15/925,258

(22) Filed: Mar. 19, 2018

(65) Prior Publication Data

US 2019/0132378 A1　May 2, 2019

Related U.S. Application Data

(60) Provisional application No. 62/579,694, filed on Oct. 31, 2017.

(51) Int. Cl.
| | |
|---|---|
| *G06F 8/65* | (2018.01) |
| *G06F 16/955* | (2019.01) |
| *H04L 67/02* | (2022.01) |
| *H04L 69/22* | (2022.01) |
| *H04L 69/329* | (2022.01) |

(52) U.S. Cl.
CPC .......... *H04L 67/02* (2013.01); *G06F 16/9566* (2019.01); *H04L 69/22* (2013.01); *H04L 69/329* (2013.01)

(58) Field of Classification Search
CPC ....... H04L 67/02; H04L 69/22; H04L 69/329; G06F 16/9566
USPC ........................................................ 709/203
See application file for complete search history.

(56) References Cited

U.S. PATENT DOCUMENTS

| | | | | |
|---|---|---|---|---|
| 7,287,042 | B1 * | 10/2007 | Jassy .................. | G06F 16/9566 707/E17.115 |
| 8,375,358 | B2 | 2/2013 | Baldwin et al. | |
| 2009/0193393 | A1 * | 7/2009 | Baldwin .................. | G06F 8/38 717/115 |
| 2012/0254835 | A1 * | 10/2012 | Muddu ..................... | G06F 8/75 717/121 |
| 2017/0262549 | A1 * | 9/2017 | James ................. | G06F 16/9566 |

FOREIGN PATENT DOCUMENTS

| | | |
|---|---|---|
| CN | 105554133 A | 5/2016 |
| EP | 1553498 A1 | 7/2005 |

OTHER PUBLICATIONS

Anonymous, "URL—Wikipedia", Available at <https://web.archive. org/web/20171029031546/https://en.wikipedia.org/wiki/URL>, Oct. 29, 2017.

* cited by examiner

*Primary Examiner* — Vivek Srivastava
*Assistant Examiner* — Hien V Doan
(74) *Attorney, Agent, or Firm* — Invoke

(57) ABSTRACT

Techniques for multi-variant HTTP requests to identify one or more HTTP resources are disclosed. A server receives an HTTP request to carry out an operation, extracts a field name and a field value recited in the HTTP request, and defines a query based on the field name and the field value. The server executes the query to identify any resources with the field value for a field with the field name and identifies a resource in a set of query results corresponding to the query. The server carries out the operation on the identified resource in the set of query results.

23 Claims, 5 Drawing Sheets

200
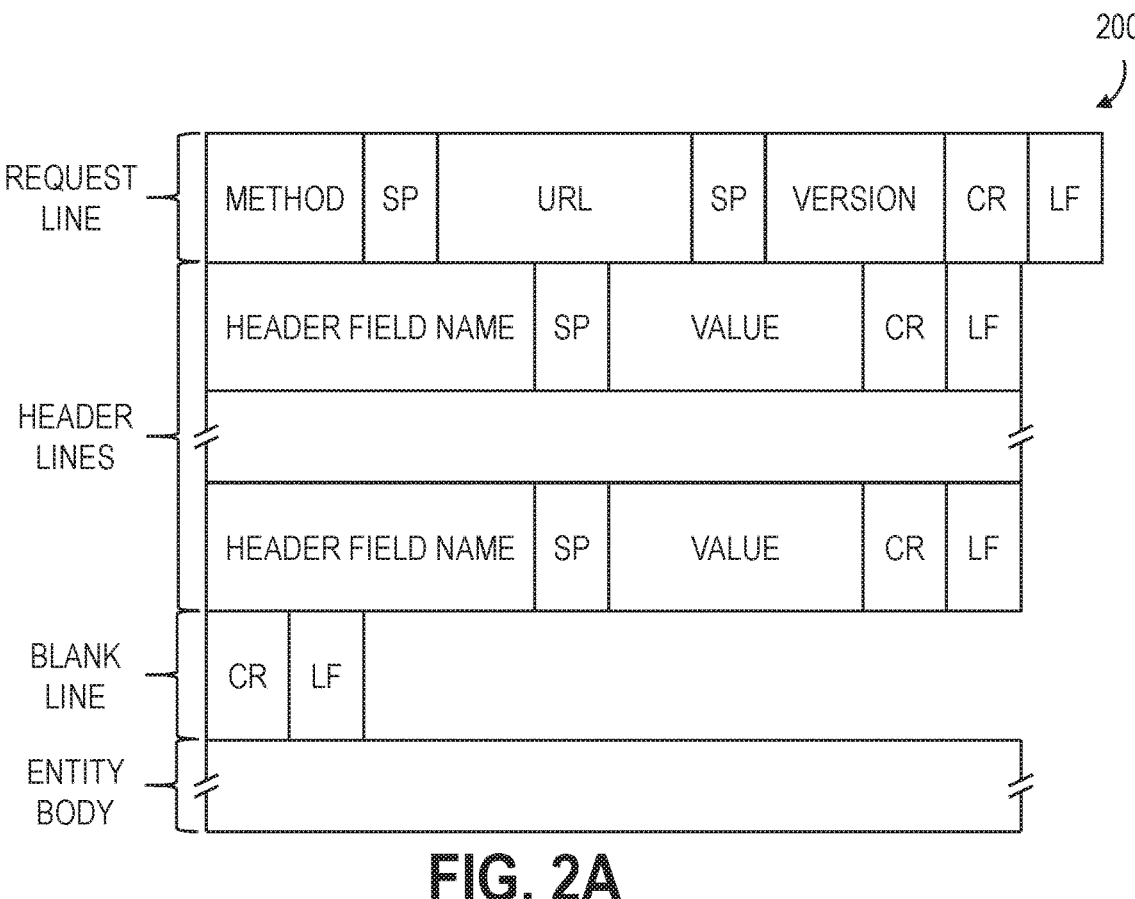
FIG. 2A
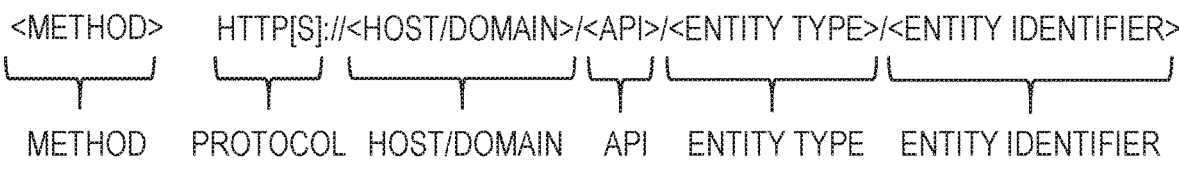
FIG. 2B
<ENTITY IDENTIFIER> = <TAG1>:<VALUE1><AND/OR><TAG2>:<VALUE2>···
FIG. 2C

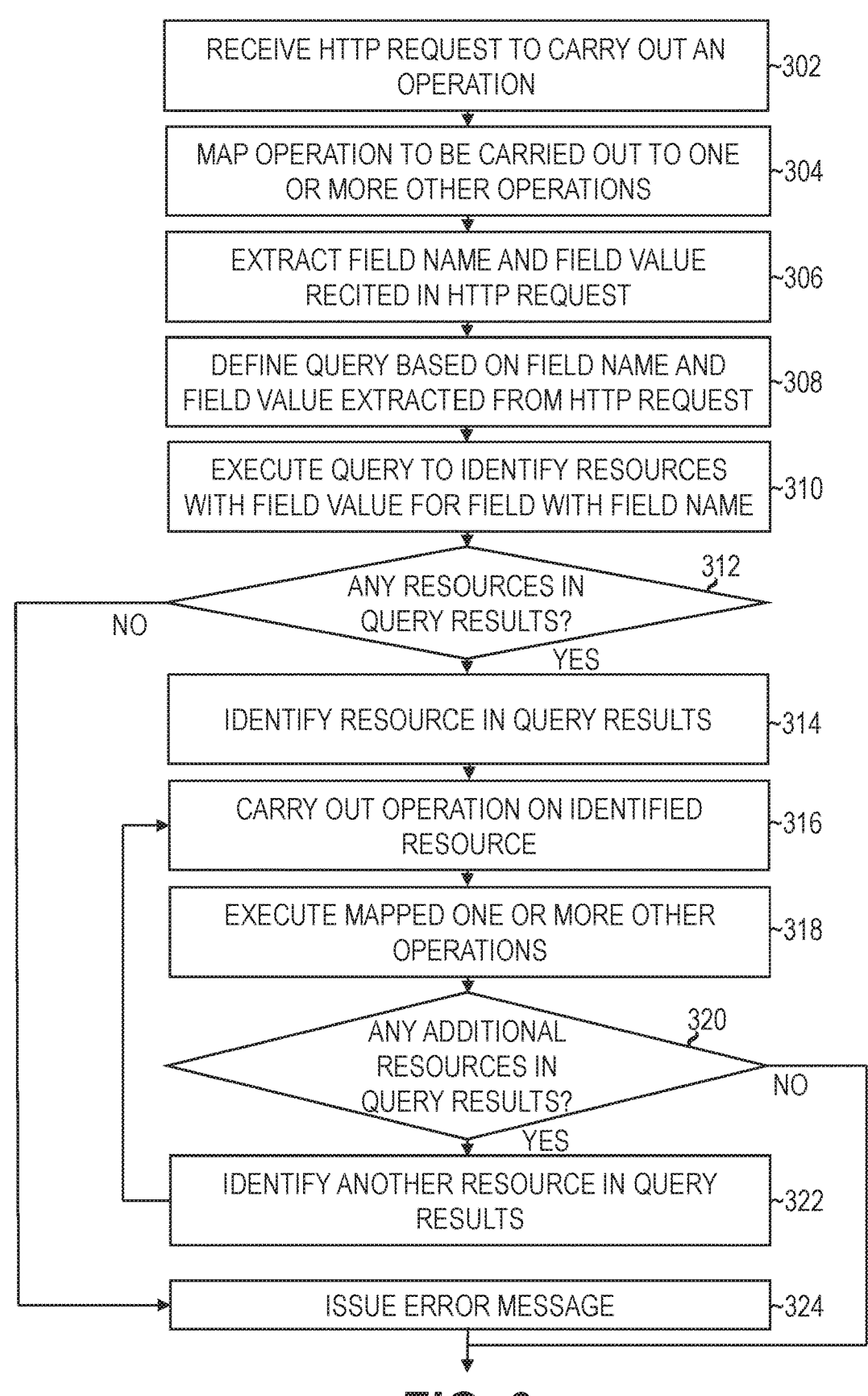

RECEIVE HTTP REQUEST TO CARRY OUT AN OPERATION ~302

MAP OPERATION TO BE CARRIED OUT TO ONE OR MORE OTHER OPERATIONS ~304

EXTRACT FIELD NAME AND FIELD VALUE RECITED IN HTTP REQUEST ~306

DEFINE QUERY BASED ON FIELD NAME AND FIELD VALUE EXTRACTED FROM HTTP REQUEST ~308

EXECUTE QUERY TO IDENTIFY RESOURCES WITH FIELD VALUE FOR FIELD WITH FIELD NAME ~310

ANY RESOURCES IN QUERY RESULTS? 312

NO

YES

IDENTIFY RESOURCE IN QUERY RESULTS ~314

CARRY OUT OPERATION ON IDENTIFIED RESOURCE ~316

EXECUTE MAPPED ONE OR MORE OTHER OPERATIONS ~318

ANY ADDITIONAL RESOURCES IN QUERY RESULTS? 320

NO

YES

IDENTIFY ANOTHER RESOURCE IN QUERY RESULTS ~322

ISSUE ERROR MESSAGE ~324

FIG. 3

IDENTIFYING AN HTTP RESOURCE USING MULTI-VARIANT HTTP REQUESTS

BENEFIT CLAIMS

This application claims the benefit of U.S. Provisional Patent Application 62/579,694, filed Oct. 31, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to HTTP protocol requests. In particular, the present disclosure relates to identifying an HTTP resource using multi-variant HTTP requests.

BACKGROUND

Distributed computing systems include a computing server that may be accessible via a public Internet Protocol (IP) network, such as the Internet, or a private local area network (LAN), by referencing a uniform resource locator (URL) or uniform resource identifier (URI) that identifies the server. Distributed computing systems often use a Hypertext Transfer Protocol (HTTP) interface for communication with a computing server. HTTP protocols include a non-secure protocol (e.g., "http") as well as a secure protocol (e.g., "https").

Requests for web services are often formatted in accordance with HTTP protocols. Such requests for web services may be referred to herein as HTTP requests. HTTP requests typically identify a target resource, corresponding to the web service, using a Uniform Resource Identifiers (URI's) having a clear directory structure. HTTP requests may incorporate various HTTP methods that are used to process resources. Examples of HTTP methods may include but are not limited to GET, POST, PUT, and DELETE. Some HTTP methods are utilized for stateless transactions, which do not store client context on a server between requests. In stateless client/server transactions, the client holds the session state.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and the references to "an" or "one" embodiment mean at least one. In the drawings:

FIGS. 2A, 2B, and 2C are diagrams that illustrate formatting of an HTTP request for identifying an HTTP resource, in accordance with one or more embodiments;

FIG. 3 is a flow chart that illustrates processing of a multi-variant HTTP request for identifying an HTTP resource, in accordance with one or more embodiments;

DETAILED DESCRIPTION

Figure 1:
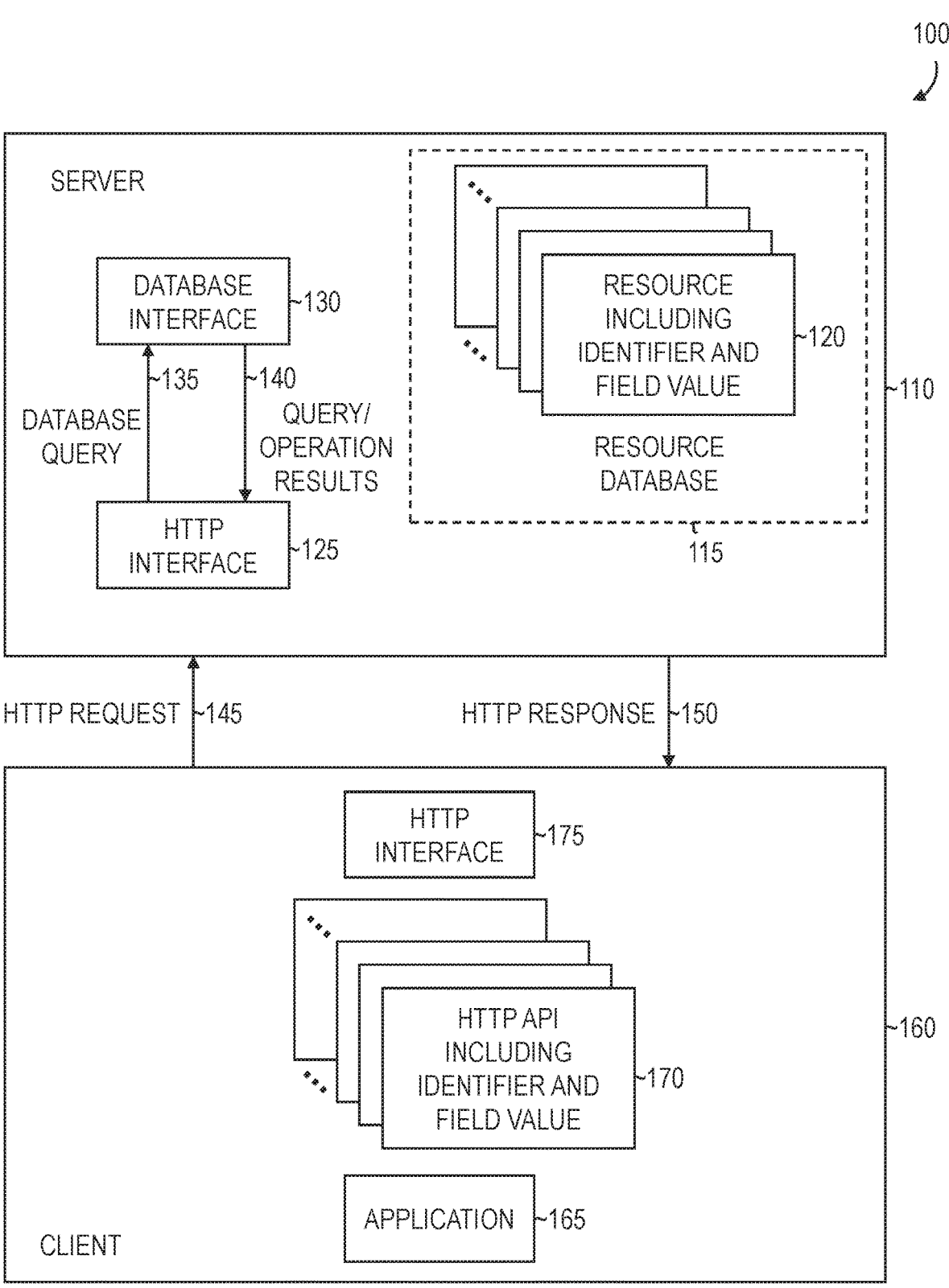
FIG. 1 is a block diagram that illustrates a distributed computing system for identifying an HTTP resource using a multi-variant HTTP request, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

In various embodiments, an HTTP request by a client computing system to a server computing system specifies a tag/value pair. The tag may correspond to a field name. The tag/value pair may identify one or more resources accessible by the server that match the specified tag/value pair. A same form of the HTTP request may be used to specify different types of tag/value pairs, e.g., identifier numbers, names, etc., using the same URI for the request. The tag/value pair may be specified anywhere in the HTTP request. However, examples herein, which should not be construed as limiting the scope of the claims, describe a tag/value pair at the end of the URI for purposes of clarity.

In various embodiments, a server may process an HTTP request based on a tag/value pair within the HTTP request. A server that receives an HTTP request from a client may initially determine whether or not the HTTP request includes a tag/value pair. If the HTTP request is determined to include a tag/value pair (for example, specified at the end of the URI), the server may extract the tag/value pair from the HTTP request. The server may then query a database of resources based on the tag/value pair. The server may perform an operation specified by the HTTP request on one or more resources that match the tag/value pair in the resource database. The server may return the one or more resources that match the tag/value pair in the resource database to the client that sent the HTTP request to the server.

In various embodiments, an HTTP request may include multiple tag/value pairs. A server may be configured to identify resources which match all of the tag/value pairs (AND operation) or at least one of the tag/value pairs (OR operation). The server may determine whether to identify resource(s) using an AND operation, or an OR operation based on information included within the HTTP request. As an example, a plurality of tag/value pairs may be included in a Boolean expression. In the Boolean expression, a plurality of different tag/value pairs may be specified together with Boolean operators to specify resources matching any of the specified tag/value pairs (e.g., an OR operation), resources matching all of the specified tag/value pairs (e.g., an AND operation), sub-resources of resources matching the specified top-level tag/value pairs and specified sub-resource tag/value pairs, and any combination thereof.

In various embodiments, a representational state transfer (REST) request, which is a type of stateless HTTP request, may be performed. REST requests are subsets of HTTP requests. The REST request may use a set of uniform and predefined stateless operations. State may not be kept from request to request when the REST request is used.

In an embodiment, operations to process an HTTP request by a server include processing a tag/value pair. A first HTTP request to carry out a first operation may be received, e.g., from a client. The first operation may be specified by the HTTP request. The first operation may be mapped to one or more other operations. A first field name (e.g., tag) and a first field value (e.g., value corresponding to the tag) recited in the first HTTP request may be extracted from the first HTTP request. A first query may be defined based on the extracted first field name and first field value. The first query may be executed to identify any resources with the first field value for a first field with the first field name. A first resource may be identified in a first set of query results corresponding to the first query. The first operation may be carried out on the first resource. The one or more other operations that the first operation is mapped to may be executed.

In various embodiments, a second field name and a second field value recited in the first HTTP request may be extracted. A second query may be defined based on the extracted first field name, first field value, second field name, and second field value. The second query may be executed to identify any resources with the first field value for the first field with the first field name and the second field value for a second field with the second field name. A second resource may be identified in a second set of query results corresponding to the second query. The first operation may be executed on the second resource.

In various embodiments, a second field name and a second field value recited in the first HTTP request may be extracted. A second query may be defined based on the extracted first field name, first field value, second field name, and second field value. The second query may be executed to identify any resources with the first field value for the first field with the first field name or the second field value for a second field with the second field name. A second resource may be identified in a second set of query results corresponding to the second query. The first operation may be executed on the second resource.

In various embodiments, a second field name and a second field value recited in the first HTTP request may be extracted. A second query may be defined based on the extracted second field name and second field value. The second query may be executed to identify any sub-resources of the first resource with the second field value for a second field with the second field name. A second resource may be identified in a second set of query results corresponding to the second query. The first operation may be executed on the second resource.

In various embodiments, a second resource may be identified in the first set of query results corresponding to the first query, and the first operation may be executed on the second resource.

In various embodiments, a second HTTP request to execute a second operation may be received. A second field name and a second field value may be extracted from the HTTP request. A second query may be defined based on the second field name and the second field value. The second query may be executed to identify any resources with the second field value for a second field with the second field name. If the server determines that no resource has the second field value for any field with the second field name, an error may be presented.

One or more embodiments described in this Specification and/or recited in the claims may not be included in this General Overview section.

2. Architectural Overview

FIG. 1 is a block diagram that illustrates a distributed computing system 100 for identifying an HTTP resource 120 using a multi-variant HTTP request, in accordance with one or more embodiments. FIGS. 2A, 2B, and 2C are diagrams that illustrate formatting of an HTTP request 200 for identifying a resource 120, in accordance with one or more embodiments. As illustrated in FIG. 1, the system 100 includes a server 110 and a client 160. Although only one server 110 and one client 160 is illustrated, in various embodiments, there may be any number of servers 110 and/or clients 160 coupled with one another via a computer communication system, e.g., a LAN or the Internet. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface refers to hardware and/or software configured to facilitate communications between a user and the system 100. The user interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

In the following description, an embodiment in which a client issues a multi-variant HTTP request to identify a resource 120 on a server is described. However, this should not be construed as limiting, as in various other embodiments, the multi-variant HTTP request to identify the resource 120 may be performed within a single computing system or application instead of between a client and a server in a distributed computing system.

In one or more embodiments, the client 160 includes an application 165, e.g., a web browser or other application that is configured to access data from another application, process, or computer system using an HTTP protocol. The application 165 may include one or more calls to access data or a resource using the HTTP protocol according to an application programming interface (API) 170. The API 170 may be configured to access the data or resource using the HTTP protocol according to an identifier and/or a field value of a field having a field name. The API 170 may refer to one of numerous calls to access the data or resource. The client 160 may also include an HTTP interface 175 via which the API 170 issues an HTTP request 145 to access the data or resource from the server 110.

The HTTP request 145 may be a stateless request. The HTTP request 145 may be a representational state transfer (REST) request that uses a set of uniform and predefined stateless operations. The stateless request may be an HTTP request wherein no state is kept from request to request. The stateless request may include an HTTP request. The HTTP request may include a normal (e.g., "http") request or a secure (e.g., "https") request.

In one or more embodiments, a web browser (commonly referred to as a browser) is a software application for retrieving, presenting and traversing information resources on the World Wide Web. An information resource may be identified by a Uniform Resource Identifier or Uniform Resource Locator (URI/URL) that may be a web page, image, video, or other piece of content. Although browsers are primarily intended to use the World Wide Web, browsers can also be used to access information provided by web servers in private networks or files in file systems. In some embodiments, the web browser may be a standalone software application that executes on the client 160 communicatively coupled with the server 110 over a computer communications network, e.g., a LAN or the Internet. In some embodiments, the web browser is an integral part of the system 100 and specifically configured to perform the operations of the system 100 in coordination with other components of the system 100. For example, as an integral part of the system 100, the web browser may not physically display a rendered webpage, but rather generate a data table in memory or data storage that represents information obtained from the server 110 via HTTP requests.

In one or more embodiments, the server 110 includes a web server that is a computer system or an application that processes HTTP requests to distribute information on the World Wide Web. The primary function of a web server may be to store, process and deliver web pages to clients. Web pages delivered by the web server may include images, style sheets, and scripts in addition to text content. The server 110 may transmit a web page, for example, via HTTP over a computer communications network (for example, a local area network (LAN) or the Internet), to the client 160 and/or the application 165 running on the client 160.

The server 110 may include a resource database 115 that stores a plurality of resources 120. Each of the resources 120 may include one or more identifiers and associated field values. An identifier may be referred to as a "tag" or a "field name," and the identifier may identify a field having a value which may be referred to as a "field value." A field having a field name and an associated value may be collectively referred to as a tag/value pair or a field name/value pair. The server 110 may process one or more HTTP requests 145 received from the client 160 via an HTTP interface 125. The HTTP interface 125 may process the received HTTP request 145 to extract an identifier and an associated field value. The HTTP interface 125 may use the extracted identifier and associated field value to define a database query 135.

The received HTTP request 145 may define an operation to be carried out on one or more resources 120. The database query 135 may be defined to specify the operation to be carried out. The specified operation may also be mapped to one or more other operations. The specified operation may also be transformed prior to being forwarded to the database interface 130, or prior to being carried out by the database interface 130 on one or more resources 120. Transforming the operation may include transforming a name of an instruction associated with the specified operation to a name of a new instruction. Carrying out the operation specified in the HTTP request 145 may include executing the new instruction resulting from transforming the specified operation.

A database interface 130 may process the database query 135 and access the resource database 115 based on the database query 135. The database interface 130 may retrieve or perform the specified operation and/or mapped one or more other operations on one or more resources 120 that are identified by the database query 135. The database interface 130 may then provide query/operation results 140 that result from executing the database query 135 on the resource database 115 to the HTTP interface 125 and/or the operations performed on the one or more resources 120. For example, when the database query 135 is to perform an operation on one or more resources 120 in the resource database 115, the database interface 130 may provide a list of all the resources 120 on which the operation is performed. The list may be a list of field values that match the field name/value pairs in the database query 135. As another example, when the database query 135 is to retrieve one or more resources 120 in the resource database 115, the database interface 130 may provide all the resources 120 having field name/value pairs that match the field name/value pairs in the database query 135.

After the database interface 130 is finished processing the database query 135 and provides the query/operation results 140 to the HTTP interface 125, the HTTP interface 125 may provide an HTTP response 150 to the client 160 including the query/operation results 140 or an acknowledgement of completing the operation specified by the HTTP request 145.

Typical APIs for HTTP requests made by a client to a server to access a resource stored at the server have different forms depending on how the HTTP requests access the resource, e.g., by an identification number, a name, etc. Such APIs typically are formed similar to the following example:

```
http[s]://someserver/some/api/path/entityType/entityId/[entitySubProperty/
entitySubProperty/[...]]
```

In this typical approach, references to particular resources according to particular entity types are fixed to the entity field, and typically hardcoded with the entity identifier in a storage such as a database.

In typical systems, when a resource is created, a unique identifier for the resource is created. This unique identifier may be created automatically by the same process that creates the resource, or specified by a calling process or user. The unique identifier may be a pseudorandom sequence of characters that does not have a meaning in and of itself to a user, but only as an identifier for the resource. A property such as a name that a user can understand and associate with the resource may also be created for the resource. Typical HTTP APIs may therefore have multiple commands to access the resource—one to access the resource by the resource's assigned unique ID, one to access the resource by the resource's name property, and possibly numerous others to access the resource according to the values of other properties.

One approach to address these issues used by typical APIs is to create sub-resources for the resources so that the resources can be accessed via the different sub-resources. Typical APIs for HTTP requests involving sub-resources use different API commands depending on how the resource is addressed. For example, the following HTTP GET request is to access a sub-resource by the sub-resource's identifier where {entityId} is the resource's identifier:

GET/some/api/version/entityType/byId/{entityId}

As another example, the following HTTP GET request is to access a sub-resource by the sub-resource's name where {entityName} is the resource's name:

GET/some/api/version/entityType/byName/{entity-Name}

In these examples, the HTTP request API to access a sub-resource by the sub-resource's identifier is different from the HTTP request API to access a sub-resource by the sub-resource's name.

Another approach used by typical APIs is to access the resource using a query. APIs for HTTP query requests may vary in form across different computing systems. For example, the following HTTP GET request is to access a resource by performing a query <someQuery> is the specific query to be performed on a matching resource:

GET/some/api/version/entityType?query=<someQuery>

Another approach used by typical APIs is to attempt to recognize and understand an entity reference type on the fly. In this approach, the system attempts to identify the type of reference passed to the request automatically. The following HTTP GET request is to access a resource according to one of several different resource reference types, specifically, either an entity name or an entity identifier, and the server processing the received HTTP request determines whether {entityNameOrId} refers to an entity name or an entity identifier on the fly:

GET/some/api/version/entityType/{entityNameOrId}

Processing the above HTTP request may dynamically attempt to determine whether the request should be matching the {entityNameOrId} to a resource name or to a resource identifier. In addition, in some cases, different resources may have a name that matches the specified {entityNameOrId} and an identifier that matches the specified {entityNameOrId}, thereby resulting in ambiguous results.

Embodiments described herein address these issues by providing flexible access to system entities via an API. An object created as a resource may also be referred to as an entity. According to the embodiments, a single API call can be used to access a resource with only changes in the API call's payload determining the field being used to identify the resource being accessed. In addition, multiple resources can be accessed using a single API call by using Boolean operators in combination with different field names and values of the different resources within the payload of the call.

FIGS. 2A, 2B, and 2C are diagrams that illustrate formatting of an HTTP request for identifying an HTTP resource, in accordance with one or more embodiments. In FIG. 2A, "SP" indicates a space, "CR" indicates a carriage return, and "LF" indicates a line feed. FIG. 2A illustrates the format of an HTTP request. The REQUEST LINE of the request starts with the HTTP METHOD, e.g., GET, DELETE, PUT, POST, HEAD, etc. The URL that follows the method indicates where the HTTP request is to be sent. The VERSION indicates the version of HTTP according to which the request is formatted. All lines following the REQUEST LINE are optional. Following the request line is a series of HEADER LINES, each of which begins with a HEADER FIELD NAME followed by a VALUE. As an example, a header line may include a field name HOST followed by a URL to indicate the host where a resource is located. Following the header lines, a BLANK LINE indicates that the body of the request follows, identified as the ENTITY BODY. The body of the request may include payload for the request. For example, if the request is to apply a patch to one or more resources, then the entity body for that request may include the patch to be applied.

FIG. 2B illustrates in greater detail the parts of an HTTP REQUEST LINE as illustrated in FIG. 2A, according to embodiments as described herein. The request begins with the METHOD, e.g., GET, PUT, etc. Following the METHOD and a space is the URL, beginning with the protocol to be used. The HTTP request can use one of two protocols, the standard protocol ("http") and the secure protocol ("https"). Following the protocol is the standard "://" character string that separates the protocol from the HOST/DOMAIN, followed by the HOST/DOMAIN. This may be an Internet domain name ending in ".com", for example. Following the HOST/DOMAIN are fields separated by the '/' character, including API and ENTITY TYPE. Following ENTITY TYPE is the ENTITY IDENTIFIER. The ENTITY IDENTIFIER may include a tag/value pair or a Boolean expression to identify one or more resources in the resource database of the server being accessed. The ENTITY IDENTIFIER may have a schema defined by <referenceType>:<referenceValue> where the referenceType matches a property of a resource 120 and the referenceValue refers to the actual value of the specified property of the resource 120 that may be used to access the resource 120. As opposed to traditional systems, where a prefix is embedded within a URL to specify what property is to be matched by the HTTP request, an equivalent of the traditional prefix is provided as the <referenceType> in the ENTITY IDENTIFIER. In this way, the URL for the HTTP request 145 may be the same for numerous different reference types. Thus, the server 110 may use a single handler to handle HTTP requests 145 regardless of the <referenceType> that is being used to access a resource 120.

FIG. 2C illustrates the composition of the ENTITY IDENTIFIER according to various embodiments. A resource may be specified according to a tag/value or field name/value pair. These pairs may be used together in a Boolean expression to identify with greater particularity the resource or resources that are requested from the server by the expression. For example, the tag may be specified as tag (e.g., "TAG1") followed by a token, e.g., a colon (":"), which is followed by a value corresponding to the tag (e.g., "VALUE1"). While a colon is provided as an example, in various embodiments, different characters may be used for the token that separates the tag from the value. In addition, parenthesis may be used to nest Boolean operators and expressions to be executed in a sequence according to the locations of the Boolean operators and expressions within the nested parentheses.

For example, the TAG1 may be "name" to indicate a field that specifies the name of the resource. A VALUE1 corresponding to the TAG1 "name" may be "MyEntity" to specify that the corresponding resource has the name "MyEntity". The TAG2 may be "id" to indicate the identifier of the resource. A VALUE2 corresponding to the TAG2 "id" may be "MyId" to specify that the corresponding resource has the identifier "MyId". A request seeking to get all resources having both the name "MyEntity" and the id "MyId" may include an ENTITY IDENTIFIER "name: MyEntity AND id:MyId", whereas a request seeking to get all resources having either the name "MyEntity" or the id "MyId" may include an ENTITY IDENTIFIER "name: MyEntity OR id:MyId".

In various embodiments, a system may export some resources 120 from the resource database 115 of a first server 110 into the resource database 115 of a second server 110 while maintaining the references between the resources 120 exported onto the second server 110 and other resources 120 in the first server 110. The resource 120 exported onto the second server 110 may be assigned a new field name/value pair, indicating the unique identifier of the original resource 120 in the first server 110. The new field name/value pair may be in addition to the unique identifier assigned to the resource 120 by the second server 110. The new field name/value pair may have a tag "externalId" and a value equal to the value of the original identifier of the resource 120 on the first server 110. The first server 110 and the second server 110 may then smoothly integrate together because the resources 120 exported from the first server 110 to the second server 110 have fields identifying the resources 120's unique identifiers on the second server 110 as well as corresponding original unique identifiers on the first server 110. An HTTP request to the first server 110 to access the exported resource 120 present on the second server 110 may be processed by the first server 110. The first server 110 may issue a corresponding HTTP request to the second server 110 to request the exported resource 120 according to the field name/value pair "externalId" and the exported resource 120's original identifier on the first server 110. The first server 110 may determine the new unique identifier of the exported resource 120 on the second server 110 and return this information to the client that made the request for the exported resource 120 to the first server 110. The first server 110 may also access the exported resource 120 on the second server 110 by using the unique identifier of the exported resource 120 on the second server 110. The first server 110 may also return the exported resource 120 that the first server 110 accessed from the second server 110 to the client that requested the exported resource 120 from the first server 110.

In various embodiments, descriptive identifiers may facilitate working with multiple resources 120 within a same resource database 115 simultaneously. The descriptive identifiers may facilitate a resource property to be used for identification of a resource 120 as a member of a group of resources 120 on the same resource database 115 that share a common value for the resource property. Accordingly, a single descriptive identifier may be appropriately applied to multiple resources 120 via a tag. In these embodiments, an HTTP request seeking a tag/value pair that is applied to numerous resources 120 may result in an HTTP response providing all of the matching resources 120. In this way, operations may be performed on all of the matching resources 120 at the same time in response to the same HTTP request. In addition, a query may be included in the ENTITY IDENTIFIER of the HTTP request to access a number of resources 120, for example, "query:<platform specific query>", where <platform specific query> is a query specific to the server 110 and/or the resource database 115. The query that returns numerous resources 120 may facilitate group access to the numerous matching resources 120, updating a property or attribute on the numerous matching resources 120, and/or moving on the numerous matching resources 120 from one location to another location as indicated in a tag/value pair of the matching resources 120. Following is an example HTTP request according to the embodiments described herein to update numerous matching resources 120 accompanied by a payload:

```
POST(PATCH) http://someserver/someApi/entityType/tag:someTag
{
"location":"some location definition"
}
```

In this example, all the resources 120 that have the tag "tag" with a value matching "someTag" may have the tag "location" updated to "some location definition". Also, various wildcards (e.g., "*", "?") may be used and processed in matching a specified tag value to determine matching resources 120 to have the "location" tag updated.

Descriptive identifiers may explicitly show which fields should be used to access resources 120. Descriptive identifiers may not require sub-resources, and thereby facilitate a flat, simple, and clean resource structure. Accordingly, a clean and simple API may be used to access the resources that use the descriptive identifiers, and existing APIs may be modified to use the schema disclosed herein for the descriptive identifiers in a straightforward manner. The schema specified herein has an advantage in that a resource 120 may be assigned numerous properties so that sub-resources may not be required. A resource 120 may be specified as a flat entity having numerous properties defined according to the schema so that the resource 120 may be identified and accessed according to any of these numerous properties instead of via sub-resources. As a result, the HTTP API structure used to access the resource database 115 may be kept simple, flat, and clean, thereby reducing documentation and maintenance burdens associated with complicated sub-resource architectures.

In various embodiments, sub-resources may also be accessed using descriptive identifiers. For example, a resource 120 may include one or more tag/value pairs (e.g., TAG1:VALUE1), as well as one or more sub-resources that also have tag/value pairs (e.g., TAG2:VALUE2). An HTTP request to access a sub-resource of the resource 120 may include a tag/value pair to match the resource 120 together with a tag/value pair to match the sub-resource of the resource 120. The tag/value pairs for the resource 120 and the sub-resource of the resource 120 may both be matched in order for the sub-resource of the resource 120 to be returned. As an example, a sub-resource of a resource 120 may be accessed with an HTTP request as follows:

```
GET http://someserver/someApi/resource/TAG1:VALUE1/sub-
resource/TAG2:VALUE2
```

Examples of operations performed by the system 100 and the system 100's constituent components are given below with reference to FIG. 3.

3. Example Embodiments

FIG. 3 is a flow chart that illustrates processing of a multi-variant HTTP request for identifying an HTTP resource, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims.

In various embodiments, a process performed by a system including a computing processor (e.g., the server 110 of FIG. 1) may process a multi-variant HTTP request for identifying an HTTP resource. For example, consider a resource 120 stored in a resource database 115 having the following properties:

```
{
    "id": "someId"
    "name": "someEntityName"
}
```

In an operation 302, the server 110 may receive an HTTP request 145 to carry out an operation. The HTTP request 145 may specify the operation to be carried out. The operation may be specified to be carried out on one or more resources identified according to the HTTP request 145. Examples of operations that may be specified by the HTTP request 145 to be carried out include POST, DELETE, GET, and PUT.

The HTTP request 145 may be received by the server 110 via the HTTP interface 125. The HTTP request 145 may include, for example, one of the following example HTTP GET requests:

```
GET http://someserver/someAPI/entityType/id:someId
GET http://someserver/someAPI/entityType/name:someEntityName
```

Either of the above example requests may be used by the client 160 to access the resource having the id "someId" and the name "someEntityName".

In an operation 304, the operation specified to be carried out by the HTTP request 145 in operation 302 may be mapped to one or more other operations. For example, the operations (e.g., HTTP requests) POST, DELETE, GET, and PUT may be mapped to one or more other operations to be carried out, including Create, Retrieve, Replace, Update, and Delete. For example, the request POST may be mapped to Replace or Update. As another example, the request GET may be mapped to Retrieve. In various embodiments, any of the originally specified operations or requests may be mapped to any one or more mapped operations. In various embodiments, a mapping of originally specified operations may include a one-to-one correspondence with the originally specified operations.

In an operation 306, a field name and corresponding field value may be extracted from the HTTP request 145. The HTTP interface 125 may extract the field name and corresponding field value. The HTTP interface 125 may search for the presence of the token, e.g., ":" or colon, within the ENTITY IDENTIFIER field of the HTTP request 145. If the token is not present, the HTTP interface 125 may determine that the HTTP request 145 is a legacy HTTP request, or primary access pattern, and treat the HTTP request 145 accordingly. Such a primary access pattern may simply specify the identifier (e.g., "someId") within the ENTITY IDENTIFIER without specifying a tag or field name. If the token is present in the ENTITY IDENTIFIER field of the HTTP request 145, the HTTP interface 125 may determine that the HTTP request 145 is a secondary access pattern and continue to identify the tag or field name prior to the token. In various other embodiments, the token may include another character, e.g., semicolon, comma, hyphen, dash, period, exclamation point, question mark, tilde, ampersand, carat, asterisk, or any other character that may be defined to be recognizable as separating the field name from the field value.

In some embodiments, the HTTP interface 125 may search for the presence of a prefix within the entity reference of the HTTP request 145. If the prefix is present, the HTTP interface 125 may determine that the HTTP request 145 is a legacy HTTP request, or primary access pattern, and treat the HTTP request 145 accordingly. Such a primary access pattern may simply specify the identifier (e.g., "someId") or other field value within the ENTITY IDENTIFIER in accordance with the prefix used in the entity reference of the HTTP request 145. If the prefix is not present, the HTTP interface 125 may determine that the HTTP request 145 is a secondary access pattern and continue to process the ENTITY IDENTIFIER to identify one or more field names or tags and field values and corresponding Boolean relationships.

By identifying the entity or entities specified to be accessed prior to processing the HTTP request 145 to access the specified entities within the resource database 115, existing handlers for legacy HTTP requests 145 need not be rewritten. Therefore, the embodiments are backward compatible with existing systems using legacy HTTP requests 145.

In an operation 308, the HTTP interface 125 may define a query based on the field name and the field value extracted from the HTTP request 145 in operation 306. The HTTP interface 125 may process any Boolean expressions in the HTTP request 145 in order to construct the query accordingly. The HTTP interface 125 may send the defined query as a database query 135 to the database interface 130. The HTTP interface 125 may also specify the operation or operations to be carried out to the database interface 130. For example, the HTTP interface 125 may define the database query 135 to specify the operation to be carried out. The HTTP interface 125 may also map the specified operation to one or more other operations.

The HTTP interface 125 may also transform the specified operation prior to forwarding the operation to the database interface 130. The database interface 130 may transform the operation specified by the HTTP interface 125 in the database query 135 prior to carrying the operation out on one or more resources 120. Transforming the operation may include transforming a name of an instruction associated with the specified operation to a name of a new instruction. Carrying out the operation specified in the HTTP request 145 may include executing the new instruction resulting from transforming the specified operation.

In an operation 310, the database interface 130 may execute the database query 135 to identify resources 120 in the resource database 125 having the field value for the field with the field name as extracted from the HTTP request 145 in the operation 306. In embodiments in which the HTTP request 145 specifies multiple field values, each of which corresponds to a specified field name, the database interface 130 may identify each of the resources 120 according to the database query 135 based upon any Boolean expressions included in the HTTP request 145.

In an operation 312, the database interface 130 may determine whether there are any resources 120 identified by executing the database query 135. The database interface 130 may analyze the results of executing the database query 135 to determine whether the results include any resources 120.

In an operation 314, if one or more resources 120 are included in the results of executing the database query 135 in the operation 310, the database interface 130 may identify a resource 120 in the query results. If there are more than one resources 120 in the query results, the database interface 130 may identify one resource 120 according to any of a number of different criteria, e.g., the resource 120 being first in a list of resources returned in the results from executing the database query 135 in the operation 310.

In an operation 316, an operation may be carried out on the identified resource 120. The operation carried out may be as specified originally in the HTTP request 145, transformed from the operation as specified originally, mapped to from the operation specified originally, or included in the database query 135. For example, if the HTTP request 145 specifies that a field of the resource 120 be updated, then the operation of updating the field may be performed in the operation 316. After the operation is carried out on the identified resource 120, the identified resource 120 may be returned to the client 160. The identified resource 120 may be returned to the client 160 via returning the identified resource 120 in the query/operation results 140 to the HTTP interface 125, which may then return the resource 120 to the client 160 as part of the HTTP response 150. If no operation is specified originally in the HTTP request 145 and included in the database query 135 to be executed on the identified resource 120, the identified resource 120 may simply be returned to the client 160. An identifier or field value of the resource 120 may be returned to the client 160 instead of the entire resource 120. The server 110 may return any of the following in the HTTP response 150: a list of resources 120 that match the HTTP request 145, a list of resources 120 that match the HTTP request 145 after being updated according to the HTTP request 145, a list of properties of the resources 120 that match the HTTP request 145 (e.g., a list of unique identifiers of the resources 120 that match the HTTP request 145), and/or an acknowledgment that the HTTP request 145 has been processed by the server 110.

In an operation 318, the one or more other operations that the operation specified in the HTTP request 145 is mapped to in operation 304 may be executed. The mapped one or more other operations may be executed on the identified resource 120.

In an operation 320, the database interface 130 may determine whether there are any more resources 120 included in the query results from executing the database query 135 in the operation 310 which have not yet been operated on in operation 316. If no further resources 120 are included in the query results, the method may end. In some embodiments, the resources 120 included in the query results may be returned together in the query/operation results 140. The resources 120 may then be returned by the HTTP interface 125 to the client 160 in an HTTP response 150.

In an operation 322, if there are additional resources 120 in the query results as determined in the operation 320, another resource 120 in the query results may be identified in the query results. The database interface 130 may identify another resource 120 according to any of a number of different criteria, e.g., the resource 120 being next in a list of resources returned in the results from executing the database query 135 in the operation 310. Following identification of another resource 120 in the query results, the method may proceed to the operation 316 again.

In an operation 324, if no resources 120 are included in the results of executing the database query 135 in the operation 310, an error message may be issued. The error message may be initially reported to the HTTP interface 125 by the database interface 130 in the query/operation results 140, and the HTTP interface 125 may then pass the error message to the client 160 in the HTTP response 150.

Figure 4:
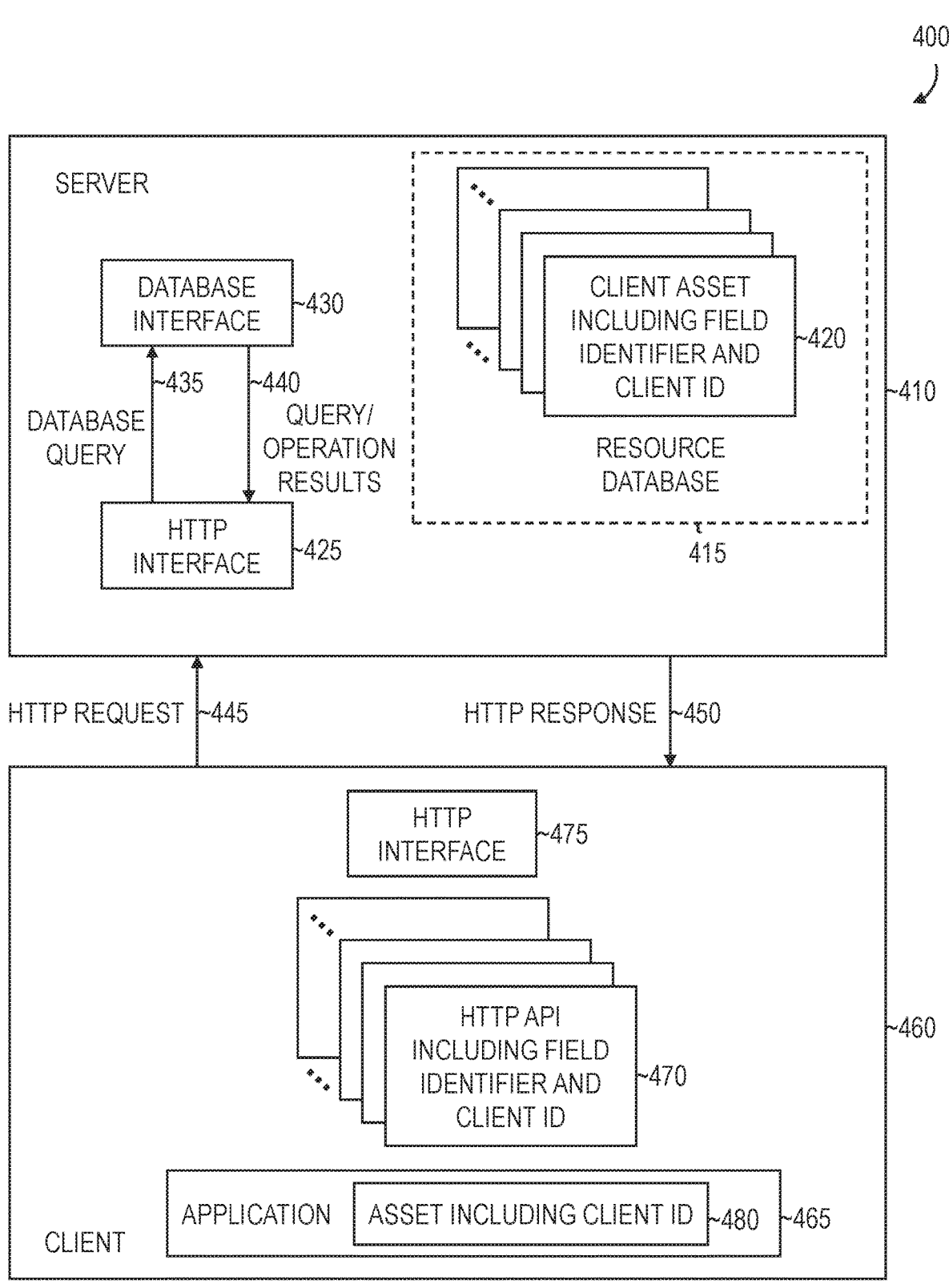
FIG. 4 is a block diagram that illustrates a distributed computing system for identifying a client asset in a server corresponding to an asset in a client using a multi-variant HTTP request, in accordance with one or more embodiments.

FIG. 4 is a block diagram that illustrates a distributed computing system 400 for identifying a client asset 420 in a server 410 corresponding to an asset 480 in a client 460 using a multi-variant HTTP request, in accordance with one or more embodiments. The distributed computing system 400 may be an embodiment of the distributed computing system 100, the server 410 may be an embodiment of the server 110, and the client 460 may be an embodiment of the client 160. The HTTP interface 425 may be an embodiment of the HTTP interface 125, the database interface 430 may be an embodiment of the database interface 130, and the resource database 415 may be an embodiment of the resource database 115. The client asset 420 including identifier and client ID may be an embodiment of the resource 120. The database query 435 may be an embodiment of the database query 135, and the query/operation results 440 may be an embodiment of the query/operation results 140. The HTTP interface 475 may be an embodiment of the HTTP interface 175, the HTTP API 470 including field identifier and client ID may be an embodiment of the HTTP API 170, and the application 465 may be an embodiment of the application 165. The HTTP request 445 may be an embodiment of the HTTP request 145, and the HTTP response 450 may be an embodiment of the HTTP response 150.

The distributed computing system 400 may provide seamless integration between different software applications operating in the distributed computing system 400. For example, one software application may migrate from one instance of a computing client 460 or server 410 to another instance of a computing client 460 or server 410 within the distributed computing system 400. As another example, two separate software applications, e.g., one application 465 on the client 460 and one resource database 415 on the server 410, may keep track of a same digital asset or data object. The digital asset or data object may be a client asset 420 stored in the resource database 415 located on the server 410 and also maintained locally by the application 465 on the client 460 as an asset 480. Each client 460 and server 410 keeping track of the same digital asset or data object may have a different unique identifier or ID associated with the digital asset or data object. The application 465 on the client 460 may assign a client ID to the asset 480, while the resource database 415 on the server 410 may assign a server ID to the corresponding client asset 420 stored within the resource database 415. In typical systems, both the application 465 on the client 460 and the resource database 415 on the server 410 would need to keep track of both identifiers, the server ID and the client ID, associated with the asset 480 on the client 460 and corresponding client asset 420 on the server 410. This can lead to problems in maintaining consistency across the distributed computing system 400.

In embodiments disclosed herein, the client asset 420 stored in the resource database 415 on the server 410 corresponding to the asset 480 in the application 465 on the client 460 may be accessed by the application 465 on the client 460 using just the client ID without the server ID associated with the client asset 420 stored in the resource database 415. This provides a seamless way for the client 460 as the primary entity owner of the asset 480 to maintain the corresponding client asset 420 stored in the resource database 415 on the server 410.

In an embodiment, the client 460 may create the asset 480 and assign a unique client ID to the asset 480. The client 460 may maintain the asset 480 within the application 465 on the client 460. During integration between the client 460 and the server 410 within the distributed computing system 400, the client 460 may export the asset 480 to the server 410. The server 410 may then create a client asset 420 as a copy of the asset 480, assign a new server ID to the client asset 420, and store the client ID of the original asset 480 as a value in a field identified by a field identifier, or tag, within the client asset 420. As an example, the field identifier may be "ExternalID". All assets and resources stored in the resource database 415 of the server 410 may be assigned server IDs, each of which is unique within the resource database 415. Each asset and resource stored in the resource database 415 may be accessed directly using the respective assigned server ID. In addition, those client assets 420 that are created by the server 410 based on assets 480 exported from the client 460 to the server 410 may also be accessed directly using a combination of the "ExternalID" field identifier and the original client ID associated with the asset 480. Thus, the client 460 may access the client asset 420 stored in the resource database 415 that corresponds to the exported asset 480 using an HTTP request that includes both the "ExternalID" field identifier and the original client ID associated with the asset 480. For example, such an HTTP request may include the following URL: http://serverName/somePath/ExternalID:<client ID> or https://serverName/somePath/ExternalID:<client ID> where "serverName" is the domain name service (DNS) server name corresponding to the server 410, "somePath" is a path defined by the server 410 for access to assets stored in the resource database 415, "ExternalID" is the field name or tag corresponding to the original client ID stored in the client asset 420, ":" is the token defined to separate the field name and the field value stored in the field associated with the field name, and <client ID> is the field value comprising the original client ID of the exported asset 480. In various embodiments, a different field name may be used instead of "ExternalID" as illustrated in this example embodiment. Likewise, "serverName" and "somePath" are provided here as exemplary only, and other embodiments may use different names or text strings for these purposes.

Any of the client assets 420 stored in the resource database 415 of the server 410 may also accessed directly using the server ID assigned to the respective client asset 420 by the server 410, for example by using an HTTP request specifying the server ID assigned by the server 410. An example of such an HTTP request may include the following URL: http://serverName/somePath/<ID> or https://serverName/somePath/<server ID> where "<server ID>" is the server ID assigned by the server 410 to uniquely identify the client asset 420 in the resource database 415.

In the embodiments described herein, each of the client 460 and the server 410 are independent of one another in their addressing and identification of resources and assets created, tracked, and managed on their respective systems. When the client 460 exports an asset 480 to the server 410 to store as an imported client asset 420 in the resource database 415, the server 410 may assign a unique server ID to the imported client asset 420 for compatibility with the server's own addressing and identification scheme for the server's other assets and resources. At the same time, the server 410 may keep track of the original client ID for the imported client asset 420. Thus, the client 460 may access the imported client asset 420 using the client ID originally assigned to the asset 480 exported to the server 410 without being concerned with a server ID assigned by the server 410 to the imported client asset 420. This becomes especially beneficial when the client 460 exports a same asset 480 to many different instances of the server 410. The client may not need to keep track of the server ID associated with the exported asset 480 in each of the instances of the server 410 to which the asset 480 is exported. Furthermore, the server 410 may modify the server ID associated with the imported client asset 420 without notifying the client 460 that exported the corresponding exported asset 480 to the server 410. Regardless of what the server 410 assigns as the server ID to the imported client asset 420, the imported client asset 420 may still be accessed by the client 460 using the client ID associated with the exported asset 480.

In an embodiment, the application 465 may perform functions and manage various assets 480, e.g., data objects pertaining to work orders. The application 465 may include an asset maintenance service that maintains assets 480. In an integration with other systems and databases in the distributed computing system 400, the application 465 may cause client assets 420 to be created in the resource database 415 of the server 410 that correspond to the assets 480 on which the application 465 performs functions in the client 460. The server 410 may include an asset monitoring service that monitors the assets 480 of the application 465. When the client asset 420 is created in the resource database 415, a new field named "ExternalID" may be added to the client asset 420 which is not included in the asset 480 exported by the application 465. The client ID of the asset 480 in the application 465 may be stored in the field named "ExternalID" by the server 410 when the client asset 420 is created and stored in the resource database 415.

An application working on or with the server 410 may access any asset stored in the resource database 415 directly using the server ID assigned to the respective asset by the server 410, whether they are client assets 420 or other assets created and/or managed by the server 410 independently of the client 460. For example, the URL for an HTTP request to access the asset may be: http://server/assetMonitoring/api/v2/assets/<server ID> where "server" is the DNS server name corresponding to the server 410, "assetMonitoring/api/v2/assets" is a path defined by the server 410 for access to assets stored in the resource database 415, and "<server ID>" is the unique server ID assigned to the asset being accessed.

The application 465 may access the client asset 420 that corresponds to the exported asset 480 using the originally assigned client ID without being concerned with the server ID assigned to the corresponding client asset 420 imported from the application 465. For example, the URL for an HTTP request to access the imported client asset 420 corresponding to the exported asset 480 may be: http://server/assetMonitoring/api/v2/assets/ExternalID:<client ID> where "ExternalID" is the field name or tag corresponding to the originally assigned client ID stored in the imported client asset 420 within the resource database 415, ":" is the token defined to separate the field name and the field value stored in the field associated with the field name, and <client ID> is the field value including the original client ID of the exported asset 480. The application 465 may not keep track of the server ID assigned by the server 410 to the imported client asset 420 corresponding to the exported asset 480.

In an embodiment, the application 465 may pass along an instruction or a name of an instruction for the server 410 to execute on the client asset 420 corresponding to the exported asset 480 as a payload of an HTTP request 445. In an embodiment, the application 465 may pass along a patch to be applied to the client asset 420 corresponding to the exported asset 480 as a payload of an HTTP request 445. In an embodiment, the application 465 may pass along an instruction or data object to be delivered to or stored in the client asset 420 corresponding to the exported asset 480 as a payload of an HTTP request 445.

In an embodiment, one or more instructions or operations specified by the application 465 as a payload of the HTTP request 445 may be transformed by the server 410 before being applied to the client asset 420 corresponding to the exported asset 480. For example, the client 460 may be one of a little endian or a big endian machine, while the server 410 is the other of a little endian or a big endian machine. An instruction or operation specified by the client 460 as a payload of an HTTP request 445 sent to the server 410 to be applied to a client asset 420 corresponding to an exported asset 480 may be specific to the endian type of the client 460. Since the server 410 is a different endian type, the server 410 may transform the instruction or operation to a corresponding instruction or operation that will perform the intended function on the client asset 420. In other words, a little endian instruction or operation may be transformed to a big endian instruction or operation or vice versa when the endianness of the client 460 and the server 410 are different.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
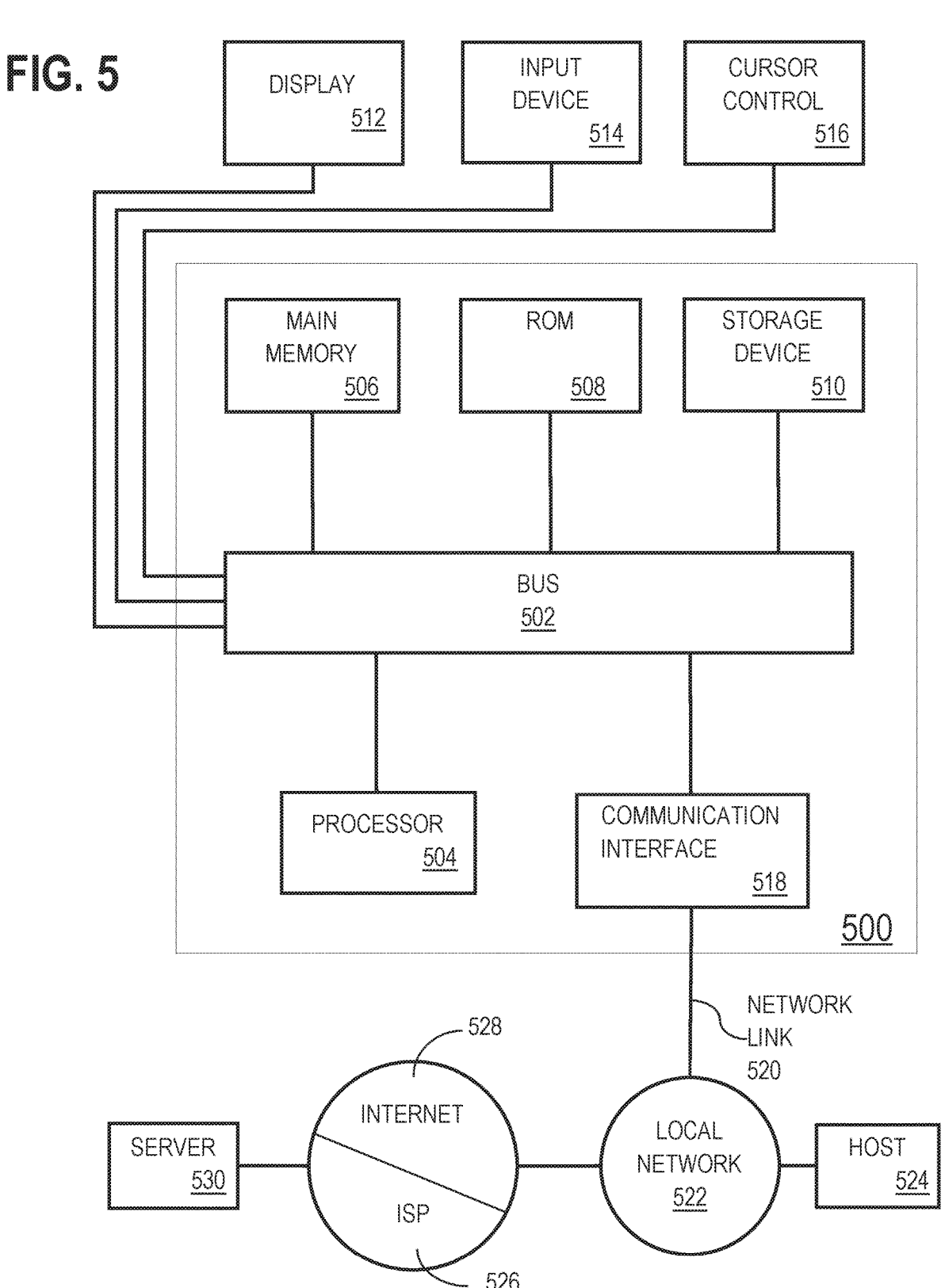
FIG. 5 is a block diagram that illustrates a computer system, in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-address-able memory (TCAM).

Storage media is distinct from but may be used in con-junction with transmission media. Transmission media par-ticipates in transferring information between storage media. For example, transmission media includes coaxial cables, copper wire and fiber optics, including the wires that com-prise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may ini-tially be carried on a magnetic disk or solid state drive of a remote computer. The remote computer can load the instruc-tions into the computer's dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of tele-phone line. As another example, communication interface 518 may be a local area network (LAN) card to provide a data communication connection to a compatible LAN. Wire-less links may also be implemented. In any such implemen-tation, communication interface 518 sends and receives electrical, electromagnetic or optical signals that carry digi-tal data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electro-magnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), net-work link 520 and communication interface 518. In the Internet example, a server 530 might transmit a requested code for an application program through Internet 528, ISP 526, local network 522 and communication interface 518.

The received code may be executed by processor 504 as the code is received, and/or stored in storage device 510, or other non-volatile storage for later execution.

In the foregoing specification, embodiments of the inven-tion have been described with reference to numerous spe-cific details that may vary from implementation to imple-mentation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium compris-ing instructions which, when executed by one or more hardware processors, causes performance of operations comprising:

receiving a first Hypertext Transfer Protocol (HTTP) request comprising (a) a character string that identifies a target resource using a target resource location, and (b) a name of a first instruction associated with a first operation;

identifying, in the character string of the first HTTP request, a first tag/value pair comprising a first field name and a first field value, a second tag/value pair comprising a second field name and a second field value, and a Boolean operator between the first field value and the second field name that specifies a Bool-ean relationship between the first tag/value pair and the second tag/value pair;

defining a first query based on the first field name, the first field value, the second field name, the second field value and the Boolean operator, wherein the first query comprises the Boolean relationship between the first tag/value pair and the second tag/value pair;

executing the first query to identify resources, wherein the resources include one of:

(a) when the Boolean operator is an "AND": a first set of resources with both the first field value for a first field with the first field name AND the second field value for a second field with the second field name; or (b) when the Boolean operator is an "OR": a second set of resources with at least one of:

the first field value for the first field with the first field name OR the second field value for the second field with the second field name;

identifying, in response to executing the first query, a first resource in a first set of query results corresponding to the first query;

transforming the name of the first instruction to a name of a second instruction, wherein the first instruction is of a first endian type and the second instruction is of a second endian type that is different from the first endian type; and carrying out, on the first resource, the first operation specified in the first HTTP request at least by executing the second instruction.

2. The medium of claim 1, the operations further comprising:

identifying a second resource in the first set of query results corresponding to the first query; and carrying out, on the second resource, the first operation specified in the first HTTP request.

3. The medium of claim 1, wherein identifying the first field name and the first field value recited in the first HTTP request comprises determining that the first HTTP request comprises a field separator token that separates the first field name from the first field value.

4. The medium of claim 1, wherein the first operation comprises applying a payload, comprised in the first HTTP request, to the first resource.

5. The medium of claim 1, the operations further comprising returning a value based on carrying out the first operation on the first resource.

6. The medium of claim 1, wherein the first HTTP request is a stateless request.

7. The medium of claim 6, wherein the stateless request is an HTTP request wherein no state is kept from request to request.

8. The medium of claim 1, wherein the first HTTP request includes a representational state transfer (REST) request.

9. The medium of claim 1, wherein the first HTTP request is a secure HTTP (HTTPS) request.

10. The medium of claim 1, wherein the first field name and the first field value are within a Uniform Resource Identifier (URI) within the first HTTP request.

11. The medium of claim 1, wherein the first field name and the first field value are subsequent to a URI within the first HTTP request.

12. The medium of claim 1, wherein the first field name and the first field value are at an end of the first HTTP request.

13. A system comprising:

at least one hardware processor;

wherein the system is configured to perform a set of operations comprising:

receiving a first Hypertext Transfer Protocol (HTTP) request comprising (a) a character string that identifies a target resource using a target resource location, and (b) a name of a first instruction associated with a first operation;

identifying, in the character string of the first HTTP request, a first tag/value pair comprising a first field name and a first field value, a second tag/value pair comprising a second field name and a second field value, and a Boolean operator between the first field value and the second field name that specifies a Boolean relationship between the first tag/value pair and the second tag/value pair;

defining a first query based on the first field name, the first field value, the second field name, the second field value and the Boolean operator, wherein the first query comprises the Boolean relationship between the first tag/value pair and the second tag/value pair;

executing the first query to identify resources, wherein the resources include one of:

(a) when the Boolean operator is an "AND": a first set of resources with both the first field value for a first field with the first field name AND the second field value for a second field with the second field name; or (b) when the Boolean operator is an "OR": a second set of resources with at least one of:

the first field value for the first field with the first field name OR the second field value for the second field with the second field name;

identifying, in response to executing the first query, a first resource in a first set of query results corresponding to the first query;

transforming the name of the first instruction to a name of a second instruction, wherein the first instruction is of a first endian type and the second instruction is of a second endian type that is different from the first endian type; and carrying out, on the first resource, the first operation specified in the first HTTP request at least by executing the second instruction.

14. A method comprising a set of operations comprising:

receiving a first Hypertext Transfer Protocol (HTTP) request comprising (a) a character string that identifies a target resource using a target resource location, and (b) a name of a first instruction associated with;

identifying, in the character string of the first HTTP request, a first tag/value pair comprising a first field name and a first field value, a second tag/value pair comprising a second field name and a second field value, and a Boolean operator between the first field value and the second field name that specifies a Boolean relationship between the first tag/value pair and the second tag/value pair;

defining a first query based on the first field name, the first field value, the second field name, the second field value and the Boolean operator, wherein the first query comprises the Boolean relationship between the first tag/value pair and the second tag/value pair;

executing the first query to identify resources, wherein the resources include one of:

(a) when the Boolean operator is an "AND": a first set of resources with both the first field value for a first field with the first field name AND the second field value for a second field with the second field name; or (b) when the Boolean operator is an "OR": a second set of resources with at least one of:

the first field value for the first field with the first field name OR the second field value for the second field with the second field name;

identifying, in response to executing the first query, a first resource in a first set of query results corresponding to the first query;

transforming the name of the first instruction to a name of a second instruction, wherein the first instruction is of a first endian type and the second instruction is of a second endian type that is different from the first endian type; and carrying out on the first resource, the first operation specified in the first HTTP request at least by executing the second instruction.

15. The media of claim 2, wherein:

the second resource is a different resource from the first resource; and both the first resource and the second resource are accessed using a single API call in the first HTTP request.

16. The media of claim 15, wherein the first resource comprises a first resource type and the second resource comprises a second resource type different from the first resource type.

17. The media of claim 15, wherein the second resource is not a sub- resource of the first resource.

18. The media of claim 1, wherein the first HTTP request comprises an HTTP method comprising at least one of a get operation, a post operation, a delete operation, a put operation, and a head operation.

19. The media of claim 1, wherein the first HTTP request is associated with a first client in a multi-client system, the operations further comprising:

receiving a second HTTP request that (a) is associated with a second client on the multi-client system that is different from the first client, and (b) comprises at least one tag/value pair that is different from any tag/value pair in the first HTTP request;

defining a second query based on values identified in the first HTTP request, including the at least one tag/value pair that is different from any tag/value pair in the first HTTP request;

executing the second query; and responsive to executing the second query: identifying the first resource in a second set of query results corresponding to the second query.

20. The media of claim 1, wherein (a) the first tag/value pair indicates a name of the first resource, (b) the second tag/value pair indicates an identifier of the first resource, and (c) the Boolean operator specifies a Boolean relationship between the name of the first resource and the identifier of the first resource.

21. The media of claim 1, wherein the Boolean operator is one of a plurality of Boolean operators in the character string of the first HTTP request, and the character string of the first HTTP request further comprises one or more sets of parentheses that indicate one or more nesting relationships between the plurality of Boolean operators.

22. The media of claim 1, wherein identifying the first tag/value pair comprises:

locating, in the character string of the first HTTP request, a field separator token that separates the first field name from the first field value; and responsive to locating the field separator token, identifying the first tag/value pair in relation to a location of the field separator token in the character string of the first HTTP request.

23. The media of claim 1, the operations further comprising:

determining that the first HTTP request does not include a prefix that, if present, would indicate that the first HTTP request is a legacy request; and wherein identifying, in the character string of the first HTTP request, the first tag/value pair, the second tag/value pair, and the Boolean operator is performed responsive to determining that the first HTTP request does not include the prefix.

* * * * *